United States Patent [19]
Budd et al.

[11] Patent Number: 5,999,234
[45] Date of Patent: Dec. 7, 1999

[54] TRANSMISSIVE CELL FOR ULTRA SMALL PIXEL APPLICATIONS

[75] Inventors: Russell Alan Budd, North Salem; George Liang-Tai Chiu, Cross River; Dale Jonathan Pearson, Yorktown Heights, all of N.Y.

[73] Assignee: International Business Machines Corporation, Armonk, N.Y.

[21] Appl. No.: 08/834,183

[22] Filed: Apr. 15, 1997

[51] Int. Cl.[6] .................................................. G02F 1/1343
[52] U.S. Cl. .......................... 349/38; 349/139; 349/143
[58] Field of Search ............................... 349/38, 39, 139, 349/143

[56] References Cited

U.S. PATENT DOCUMENTS

| | | | |
|---|---|---|---|
| 5,247,289 | 9/1993 | Matsueda | 349/38 |
| 5,317,432 | 5/1994 | Ino | 349/38 |
| 5,694,188 | 12/1997 | Sano et al. | 349/139 |
| 5,734,451 | 3/1998 | Yanagawa et al. | 349/43 |
| 5,757,453 | 5/1998 | Shin et al. | 349/39 |
| 5,852,485 | 12/1998 | Shimada et al. | 349/141 |
| 5,852,486 | 12/1998 | Hoke | 349/139 |

*Primary Examiner*—William L. Sikes
*Assistant Examiner*—Toan Ton
*Attorney, Agent, or Firm*—Daniel P. Morris

[57] ABSTRACT

A method and structure is presented for a display with reduced size pixels while retaining the transmissive approach. This enables continued use the least expensive transmission optics available. In an embodiment, it employs back-end-of-the-line vertical cells built on top of the row and column x, y lines of the pixels. In a PDLC type display embodiment each vertical cell is filled with PDLC which operates in a normally black mode known as the PDLC reverse mode. When the pixel control voltage is set ON, the liquid crystal is perpendicular to the light path resulting in a light pass through providing a bright state. When the control voltage is set OFF, the liquid crystals are randomly oriented, only the scattered light goes through the cell, so the pixel is in its OFF state. PDLC used here has two advantages. Firstly, the PDLC requires no rubbing. It is difficult to rub individual cell walls. Secondly, the use of both polarizations by the PDLC increases its luminous efficiency. Various embodiments are described for implementing vertical active electrodes and common ground electrodes. Advantages are described for employing the vertical electrodes with various implementations of a hidden storage capacitor.

18 Claims, 19 Drawing Sheets

TRANSMISSIVE CELL FOR ULTRA SMALL PIXEL APPLICATIONS

FIELD OF THE INVENTION

The present invention is directed to the field of liquid crystal displays. It more specifically directed to LCD cell design techniques.

BACKGROUND OF THE INVENTION

Scientists continue to strive to find ways to reduce the cell size of liquid crystal displays for a variety of developing applications. This becomes important when considering the small cell size dictated by monochromatic head-mounted or optical projection displays required for a UXGA form factor. These require provision of 1600×1280 pixels with a cell size of 18×18 $\mu m^2$. A comparable colored display requires a cell size of 6×18 $\mu m^2$ for each primary color. Display cell structures that are based on the transmissive liquid crystal technologies are well developed and their continued use allow the scientists to take advantage of their simple and low cost optics. In these prior art display techniques, as the display cell size is made to shrink to less than 20 microns the LCD electrode width becomes comparable in size to the LCD layer thickness. This layer thickness provides the gap between the LCD control electrodes. In this situation, the ability to regulate the light transmitting properties of each pixel becomes less and less controllable. This is due to the 3D-effect inherent in liquid crystals. The 3D-effect causes irregular switching control when the LCD ratio of electrode width to gap thickness becomes small. Typical displays employ a safe LCD ratio of greater than five to one to effectively eliminate the 3D-effect.

FIG. 1 shows a pixel within a typically assembled liquid crystal display 100. It shows a lower substrate 130 upon which the semiconductor circuit 132 and the lower electrode 135 is formed. The upper substrate 110 is separated from the lower substrate 130 by a liquid crystal layer 120. The liquid crystal layer 120 is covered with the upper electrode 115. The liquid crystal ON/OFF state control voltage is connected across the lower 135 and upper 115 electrodes. When the control voltage is present the liquid crystal is in one light transmitting state, and when the control voltage is not present the liquid crystal is in the opposite light transmitting state.

In prior art liquid crystals the thickness 'y' 140 of the liquid crystal layer 120 is generally greater than 6–8 microns. The width 'x' 150 of the horizontal lower layer electrode 135 is usually greater than 40 microns. This results in an LCD pixel aspect ratio of at least 5:1. In order to achieve a smaller size pixel using this technique, the width 'x' 150 of the horizontal lower layer electrode 135 must be reduced. This leads to the 3D effects problem in controlling the ON/OFF state of the liquid crystal.

Typically a PDLC material requires a cell gap thickness of 6 to 8 microns so that light passing through the material is sufficiently scattered in the OFF state. Prior art techniques use horizontal electrodes. In this case, as the width of the electrodes is reduced the ratio of the electrode width 'x' 150, to cell gap thickness 'y' 140, becomes perilously small. For example, a 6 micron width electrode with a 6 micron cell gap seriously suffers from the aforementioned 3D electrical field effects. In this situation, the cell does not completely switch from the 'OFF' to the 'ON' state. Also, near the edges of the cell insufficient field strength exists to adequately align the PDLC material to efficiently pass the light. Additionally, light passing through the cell at angles off the display normal are scattered and lost due to the insufficiency of the field strength.

The present invention overcomes this problem by using vertical electrodes. Back-end-of-the-line vertical cells are built on top of the x, y lines. Each vertical cell is filled with PDLC (polymer dispersed liquid crystal). By forming and aligning the electrodes in a vertical manner the 3D-effect problem is solved in a way that allows small pixel sizes to be used. This is achieved without loss of pixel contrast while still maintaining relatively complete switching from dark to bright states. Another problem overcome by the present invention is sustaining the efficiency of light transmission through each pixel. This is accomplished by maintaining an aperture ratio of greater than 20 percent even when the pixel edges are in the order of 6 microns transmitting the light.

As cell size is reduced by the use of vertical electrodes another problem becomes apparent. This is the problem that the percentage of clear pixel area or aperture ratio of the prior art designs becomes unacceptably low. This is due to the light obscuring properties of the opaque areas within each pixel taken up by the row and column lines, the thin-film-transistor and the storage capacitor.

A display should provide an aperture ratio of greater than 30%. In liquid crystal displays having relatively large pixels, the storage capacitor obscures about 10 to 20% of the region through which light is transmitted in the transmissive display. As the pixel cell size is reduced the percentage of area obscured by the storage capacitor becomes intolerable. It causes a severe reduction in the amount of available light transmitted through the pixel.

None of the known existing transmissive liquid crystal cells on poly-Si or c-Si can be scaled to such small cell sizes while maintaining a greater than 30 percent aperture ratio. Two alternatives have been suggested. One method is to use reflective cells. This approach requires more expensive optical components. The other approach calls for self-luminous cells such as the LED, electroluminescence, or organic-LED cells. All self-luminous cells face the differential aging problem that is a material-related unknown at the present time.

One aspect of the present invention also solves this problem by using a vertical trench capacitor which is hidden under the row and column lines. In this way, the opaque area of each pixel is limited to the areas taken up by a single transistor and the row and column x,y lines.

SUMMARY OF THE INVENTION

It is an object of the present invention to provide a structure comprising: a first plate; a second plate disposed adjacent to the first plate to form a space therebetween, the space is filled with a liquid crystal material; one of the first plate and the second plate has electrically conductive patterns thereon; and a capacitive element disposed to be in a generally perpendicular direction with respect to a portion of the electrically conductive pattern.

In an embodiment the structure has a plurality of the capacitive elements, and/or the capacitive elements are formed from metal plates disposed in the generally perpendicular direction, and/or the capacitive element is formed in one of the plates from a semiconductor.

An other aspect of the present invention provides a display structure of an array of pixels, each of the pixels comprising: a perimeter defined by a pair of row lines and a pair of column lines; the lines enclosing a light passing area defining an aperture; a thin film transistor coupled to the lines; a capacitor for having a first and second terminal, the first terminal being coupled to the transistor; a vertical active electrode coupled to the first terminal for accepting a first control potential polarity; a second vertical electrode coupled to the second terminal for accepting a second control potential polarity, and placed such that a space is formed between the vertical active electrode and the second vertical electrode; and PDLC material included within the space.

In an embodiment of the structure the capacitor is formed behind at least one of the lines defining the each pixel such as to limit an amount of the light passing area being obscured by the capacitor; and/or the row line is a gate line defining a gate electrode, the column line is a data line defining a data electrode, and the capacitor is a storage capacitor; and/or the thin film transistor is formed in an inverted staggered structure configuration; and/or the array of pixels is formed by a plurality of liquid crystal cells extendible to a resolution required for UXGA light transmission for head-mounted displays; and/or the capacitor is formed into an etched out area in the at least one of the lines; and/or the capacitor is formed in a 'L' shaped configuration; and/or the capacitor is formed in a trench etched out of a C-Silicon layer behind at least one of the lines, the trench being surrounded by an insulating layer filled with polysilicon.

Still an other aspect of the present invention provides a method for forming a display structure having an array of pixels, each of the pixels being defined by crossing essentially vertical and essentially horizontal lines, the method comprising the steps of: providing a semiconductor on insulator substrate; patterning a plurality of trench profiles for each of the pixels along a portion of at least one of the lines; etching away material from the semiconductor within the profiles to form a plurality of trenches; insulating an inside surface of each of the trenches; filling each of the trenches with a conductive material to form a plurality of first capacitor electrodes for a plurality of capacitors; patterning a plurality of second capacitor electrodes to surround each of the trenches; etching away the silicon outside of the patterned second electrode areas to form a clear area within each of the pixels; insulating the horizontal lines; depositing a gate line along the horizontal lines; depositing a plurality of semiconductor stacks, each of the stacks being coupled to one of the horizontal lines, one of the vertical lines, and to one of the capacitors; depositing a layer of conducting material within the clear area to form a third electrode by which a liquid crystal is switched between ON and OFF; insulating the vertical lines; depositing a metal data line along the vertical lines and having a portion forming a source for each of a plurality of transistors and thus completing the formation of a transistor gate for each of the transistors; and forming a drain contact for each of the transistors overlapping a portion of the indium tin oxide and the first capacitor electrode, thereby forming a lower substrate.

In an embodiment the method further comprising the steps of: passivating the lower substrate, providing an upper substrate and liquid crystal, assembling the lower substrate with the upper substrate separated by the liquid crystal to form at least a portion of a liquid crystal display,; and/or the conductive material is polysilicon; and/or the trenches are formed in a 'L' shape and/or the conducting material is indium tin oxide; and/or the semiconductor on insulator substrate is a silicon on insulator substrate and/or forming a display having pixels defined by essentially horizontal and vertical lines comprising the step of forming each storage capacitor to be hidden behind at least one of the lines to provide each of the pixels with an increased aperture ratio.

An other aspect of the present invention provides a display structure comprising a plurality of pixels defined by the crossings of two substantially vertical lines with two substantially horizontal lines, the lines being covered by insulated metal lines, each of the pixels comprising: a thin film transistor coupled to the metal lines, a storage capacitor formed behind at least one of the lines and coupled between the transistor and at least one of the lines, and having vertical active electrodes for accepting a positive control voltage, and having common vertical ground electrodes, and having PDLC material between the vertical active electrodes and the common vertical ground electrodes. In an embodiment the storage capacitor is formed in a trench etched out of the at least one of the lines.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

Figure 1:
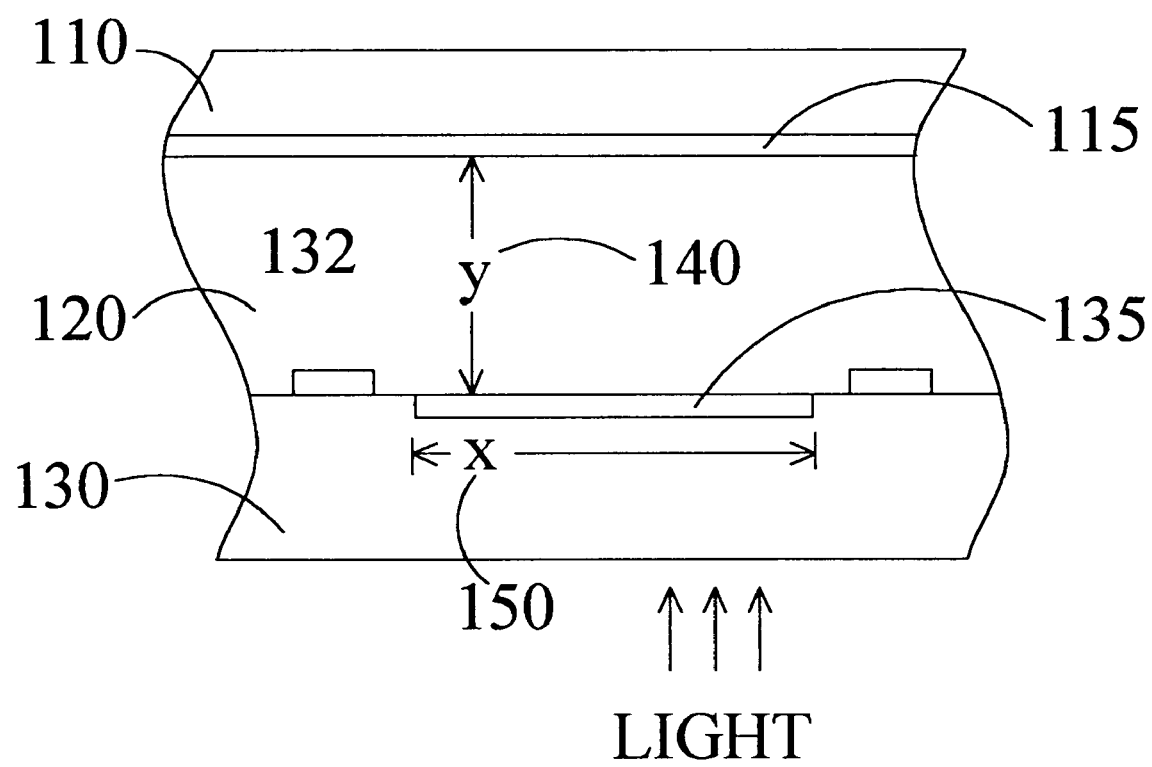
FIG. 1 shows a pixel within a typically assembled liquid crystal display.
Figure 2:
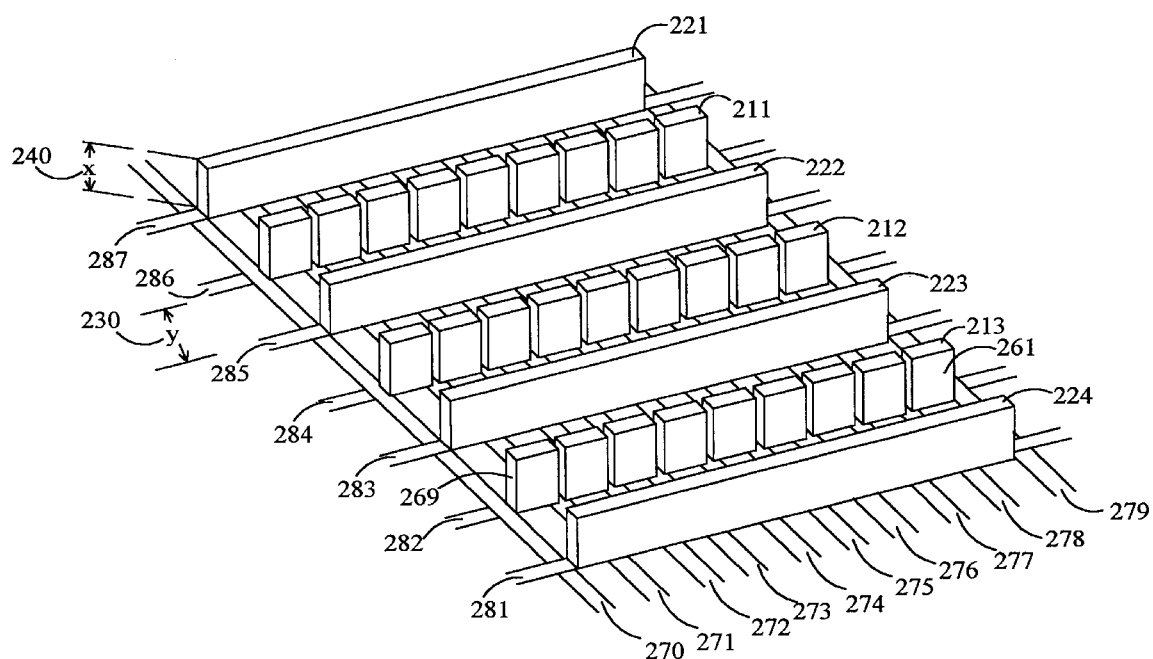
FIG. 2 shows an isometric view of an embodiment of the present invention.

The approach here is to provide a method and structure for a display with reduced size pixels while retaining the transmissive approach. This enables continued use the least expensive transmission optics available. As shown in FIG. 2, back-end-of-the-line vertical cells are built on top of the row and column x, y lines. In a PDLC type display embodiment each vertical cell is filled with PDLC which operates in a normally black mode known as the PDLC reverse mode. When the pixel control voltage is set ON, the liquid crystal is perpendicular to the light path resulting in a light pass through providing a bright state. When the control voltage is set OFF, the liquid crystals are randomly oriented, only the scattered light goes through the cell, so the pixel is in its OFF state. PDLC used here has two advantages. Firstly, the PDLC requires no rubbing. It is difficult to rub individual cell walls. Secondly, the use of both polarizations by the PDLC increases its luminous efficiency.

FIG. 2 shows an isometric view of an embodiment of the present invention. It shows rows of vertical center electrodes 211–213 included between rows of vertical ground electrodes 221–224. Each row of center electrodes 211–213 has a separate vertical center electrode for each pixel. Thus, row 213 shows nine center electrodes starting from 261 to 269. Each separate vertical center electrode is used in association with a ground electrode to control the light transmitting properties of its corresponding pixel. With the configuration of FIG. 2 the LCD gap thickness 'y' 230 is the separation between a row center electrodes and the neighboring ground electrodes. The width of each electrode corresponds to its vertical height 'x' 240. The electrode height 'x' 240 is made to be several times larger than the gap thickness 'y' 230 to result in a high LCD gap to width ratio. This eliminates the 3D-effect problem even when the spacing between column lines 270–279 and the spacing between row lines 281–287 are both in the order of six microns.

It is noted that the electrode arrangement shown in FIG. 2 is just a particular embodiment of the present invention. It shows a center pixel control electrode between a pair of ground electrodes. This placement provides advantages in reducing crosstalk from pixel row to pixel row, and in resulting in a rectangular pixel formation normally used for color displays. An alternative pixel configuration has alternating rows of vertical control electrodes and ground electrodes. This arrangement when used with symmetrical row and column placements produces a configuration of generally square pixel often employed in monochromatic displays. In general this square type of pixel configuration results in the smallest overall pixel dimensions. In this case a TFT transistor and a storage capacitor is generally constructed in a corner of the pixel adjacent to and making contact with a crossing row and column.

It turns out that the results of the present invention making the pixels very small in size uncovers a secondary problem. The problem is that as the pixel dimensions are made smaller and smaller, the efficiency of light transmittal through each pixel is reduced. Light transmission efficiency through the pixel becomes reduced by the increasing percentage of pixel area taken up by its required opaque components. A display should provide an aperture ratio of greater than 20 to 30 percent. The problem is evident by considering a prior art pixel layout for a thin-film transistor LCD which is shown in FIG. 3.

Figure 3:
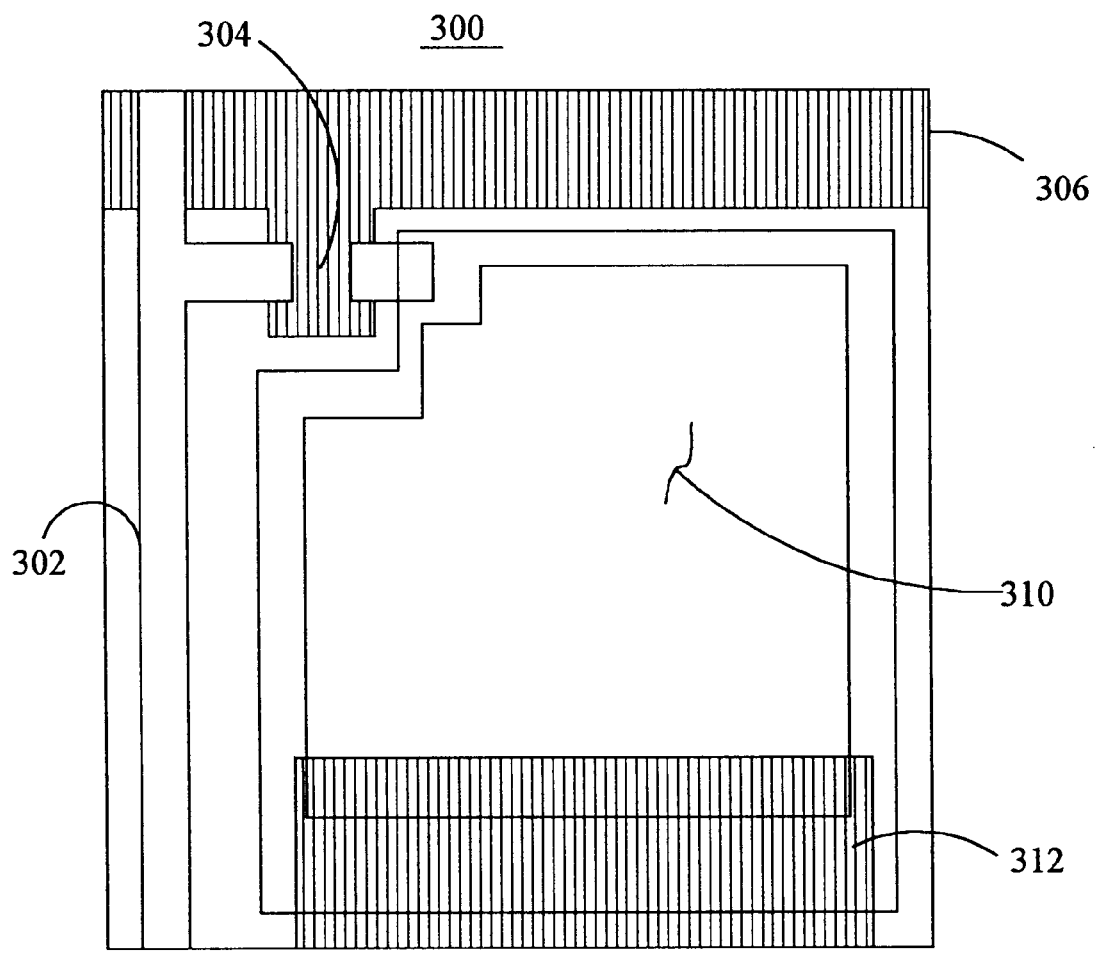
FIG. 3 shows a single pixel with its associated components in the path of the light transmission in accordance with the present invention.

FIG. 3 shows a single pixel 300 with its associated components in the path of the light transmission. The data line 302 defines the pixel's vertical boundary. The gate line 306 defines the pixel's horizontal boundary. A thin film transistor, TFT, 304 is formed at a function of the gate line and the data line. The cell capacitor 312 is shown running horizontally along the lower portion of the aperture 310. The size of the aperture 310 shown is reduced by the presence of the capacitor 312 by 10–20%. As the cell size is reduced further, the capacitor takes a larger percentage of the otherwise available aperture area.

Figure 4:
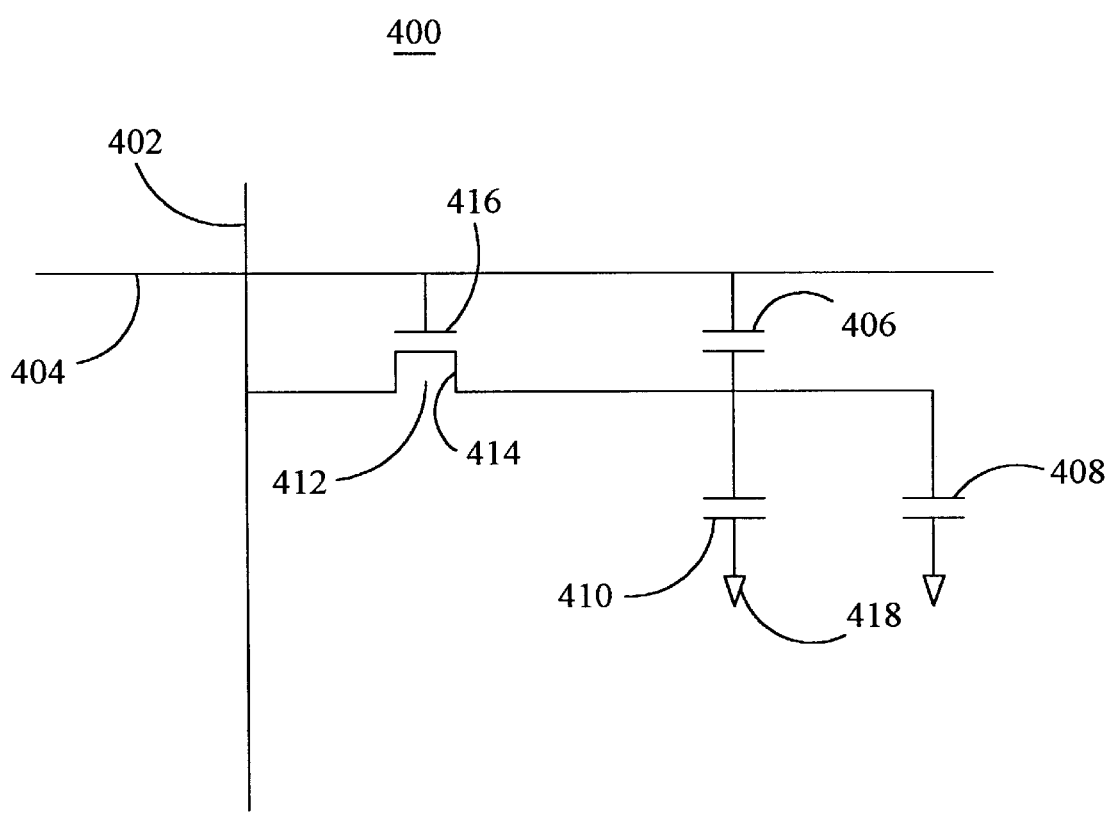
FIG. 4 shows the equivalent electrical circuit of an LCD pixel.

FIG. 4 shows the equivalent electrical circuit 400 of an LCD pixel. It shows a vertical data line 402 and a horizontal gate line 404. A thin film transistor 412 has its gate terminal connected to the gate line 404 and its source terminal connected to the data line 402. An inherent liquid crystal common electrode capacitor $C_{LC}$ 410 occurs between the TFT's drain 414 and the common electrode 412. It nominally has a capacitance of 1 fF. An inherent gate capacitor $C_{gp}$ 406 occurs between the TFT's gate 416 and drain 414. A storage capacitor $C_s$ 408 is formed between the TFT drain 414, and the common electrode 412 or the gate line 404. It typically needs to be between 20–100 f-Farad.

As fabricated in the prior art the storage capacitor significantly reduces the aperture. None of the existing transmissive liquid crystal cells on poly-Silicon or C-Si can be scaled to very small cell sizes while maintaining a 20–30% aperture ratio. Two alternatives have been suggested. One approach is to use reflective cells which requires the use of more expensive optical components. The other approach calls for self-luminous cells such as the LED, electroluminescence, or organic-LED cells. All self-luminous cells face the differential aging problem which is a material-related unknown at the present time.

Figure 5:
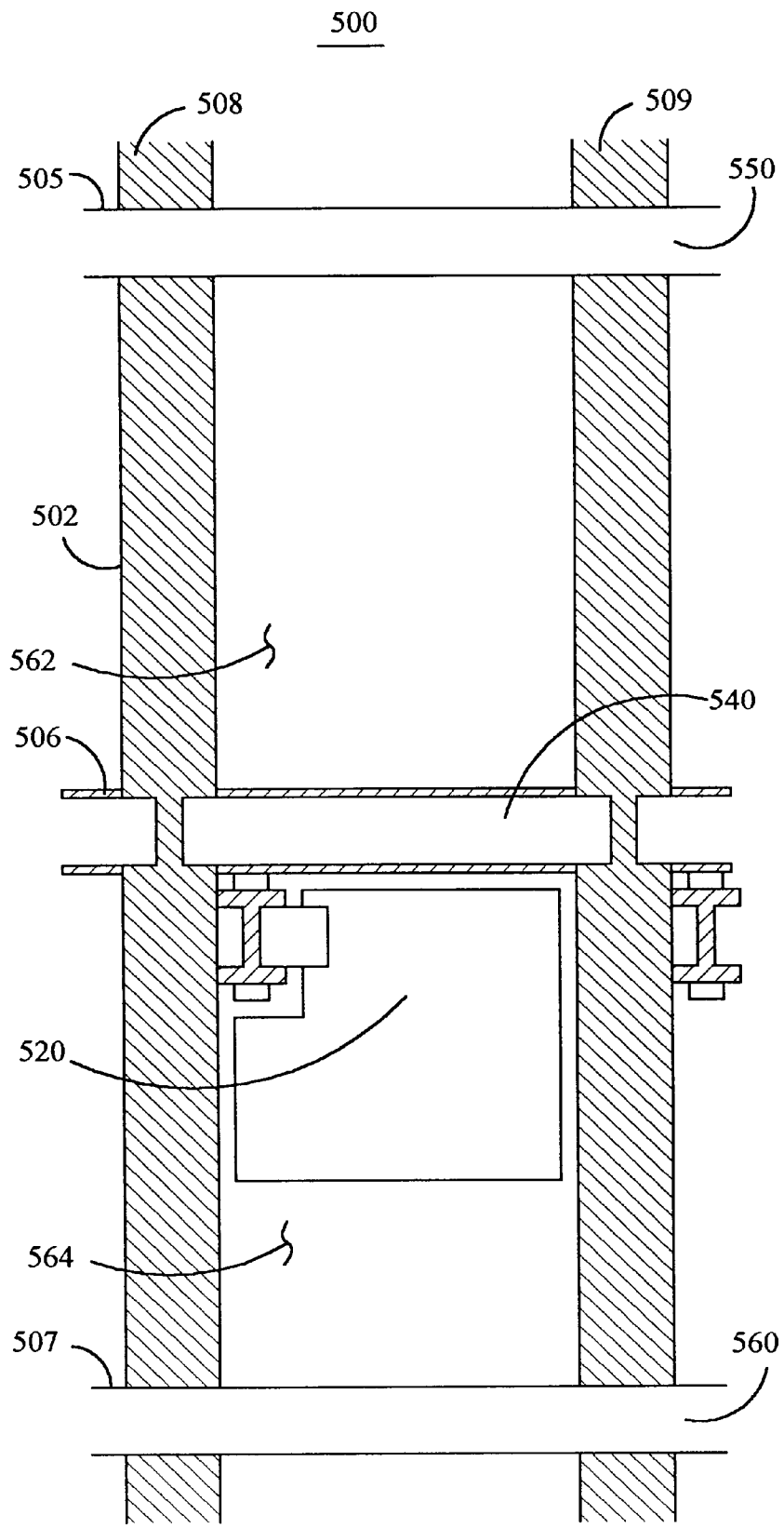
FIG. 5 shows a top view of a PDLC with vertical electrodes in accordance with the present invention.

FIG. 5 shows a top view of a PDLC with vertical electrodes 500 in accordance with the present invention. It shows a pixel 502 included between the crossing of two row lines 505, 507 and two column lines 508 and 509. A central row 506 runs through the pixel 502 and includes vertical center electrode 540. Also shown are the pixels' TFT and storage capacitor 520. Pixel 502 has two clear areas 562 and 564. An upper clear area 562 is between the vertical center electrode 540 and the upper vertical ground electrode 550 on row 505. A lower clear area 564 is between the storage capacitor 520 and the lower vertical ground electrode 560 on row 507. It is evident that the lower clear area 564 is smaller than the upper clear area 562 due to the placement of the storage capacitor 520. This becomes a very serious problem when implementing the present invention with extremely small pixel areas.

Figure 6:
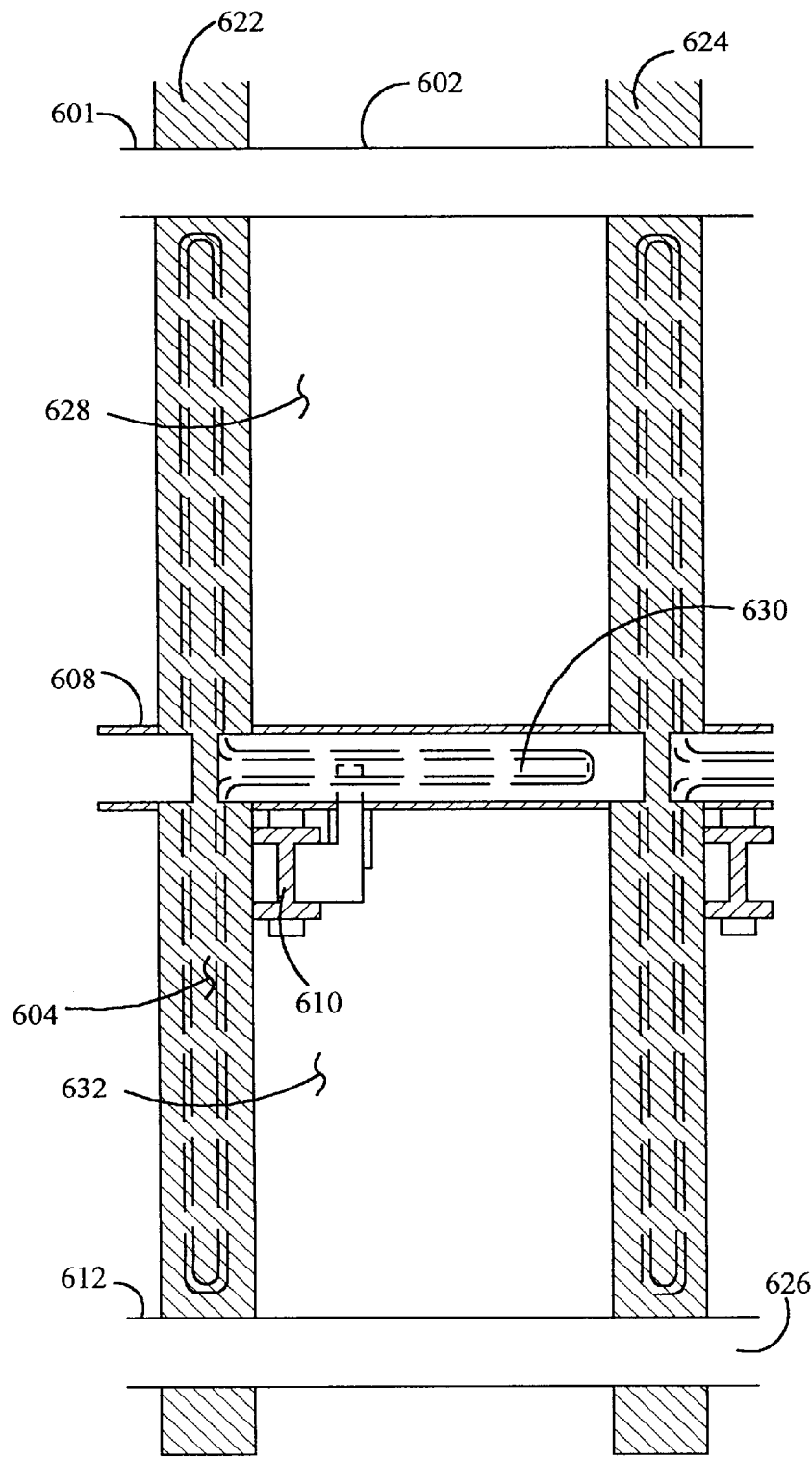
FIG. 6 shows a display utilizing a combination of vertical electrodes and storage capacitors formed behind one or more of the vertical electrodes in accordance with the present invention.

A copending application entitled "A Transmissive Liquid Crystal Cell With Trench Capacitors" Ser. No. 08/749,746, incorporated herein by reference, provides a structure and method to solve this aperture ratio problem by hiding the storage capacitor for each pixel behind the row and column lines. The technique described therein is also used to advantage in combination with the present invention. Thus it is advantageous that besides making the display utilizing vertical electrodes, to also form the storage capacitor behind one or more of the vertical electrodes. An embodiment 600 using this combination is in FIG. 6. FIG. 6 shows a pixel 602 included between two adjacent column lines 622, 624 and between two row lines 601, 612. A row line 608 is located in the pixel's 602 center upon which the center vertical electrode 630 is formed. A thin film transistor 610 is shown at the crossing of column line 622 and row line 608. The trench area shown in FIG. 6 shows the trench capacitor area extended to form a 'T' shape to also include the area under the row lines. Thus, the capacitor formation area is under both the center electrode and the column data lines. This unique space utilization for a display requirement results in the ability to form a capacitor with a higher capacitance around a pixel, thereby enabling the pixel dimensions to be reduced still further. A trench capacitor 604 is shown running behind column 622 and under vertical center electrode 630. In an alternate embodiment the capacitor also runs under either or both the vertical center electrode 630 and the ground electrode 626. The pixel 602 has an upper clear area 628 and a lower clear area 632. In this case the lower clear area 632 is identical in size to the upper clear area 638 except for a corner taken up by the TFT 610. No otherwise clear area is taken up by the storage capacitor 604. In an alternate embodiment pixel control electrode rows alternate with ground electrode row. In this case, the storage capacitor generally is formed in a trench having an 'L' shape as described in the before referenced copending application.

Thus although in prior art liquid crystal displays, the storage capacitor obscures a relatively significant region through which light is transmitted in the transmission display, the present invention used in combination with vertical trench capacitor hidden under the row and column lines also solves this problem.

The following is an overview of the process to form a structure in accordance with the present invention starting with an SOI substrate, vertical trenches are etched into the substrate within rows and/or columns. A thin oxide layer (or oxide/nitride layers) of about 50 Angstroms is grown. The trench is filled with a conductive material such as polysilicon. This serves as the inner capacitor electrode. Next, TFTs are built. The drain side of the cell TFT is electrically connected to the polysilicon side of the trench capacitor. The single crystal side of the trench capacitor is a common electrode to the substrate. The trench capacitor is designed to achieve a capacitance of 20 fF to 100 fF. Column and row, x and y, lines are then built. Back-end-of-the-line vertical cells are built on top of the x, y lines. Each vertical cell is filled with PDLC. Each cell is formed to have a via coming from its bottom side to contact the center electrode. The vias are often made of tungsten studs, so that a copper plating process can be used to build on top the tungsten. Presently, the copper plating process can achieve a 5:1 aspect ratio. Here a 3:1 to 5:1 aspect ratio is used depending on the PDLC properties. Once the cell structure is built, it is filled with PDLC, and is covered with a top cover glass. The top cover glass need not be coated with ITO, since no electrical contact is formed using the top cover.

A method to implement an embodiment of the present invention in combination with trench capacitors includes the steps to fabricate the liquid crystal cells shown in FIGS. 7–13. Reference should be made to these figures for this process description. The process usually starts with a transparent silicon-on-insulator, SOI, substrate 724, shown in FIG. 7. The substrate 724 is large enough for one or more displays. The substrate 724 is covered with an insulator 726 in the order of ½ to 1 mm thick, and a 1 micron layer of silicon 720. Typical useable transparent insulator materials include silicon on quartz, and silicon on sapphire. The trench capacitor profile 701–710 is then patterned and etched into the SOI 720.

Figure 7:
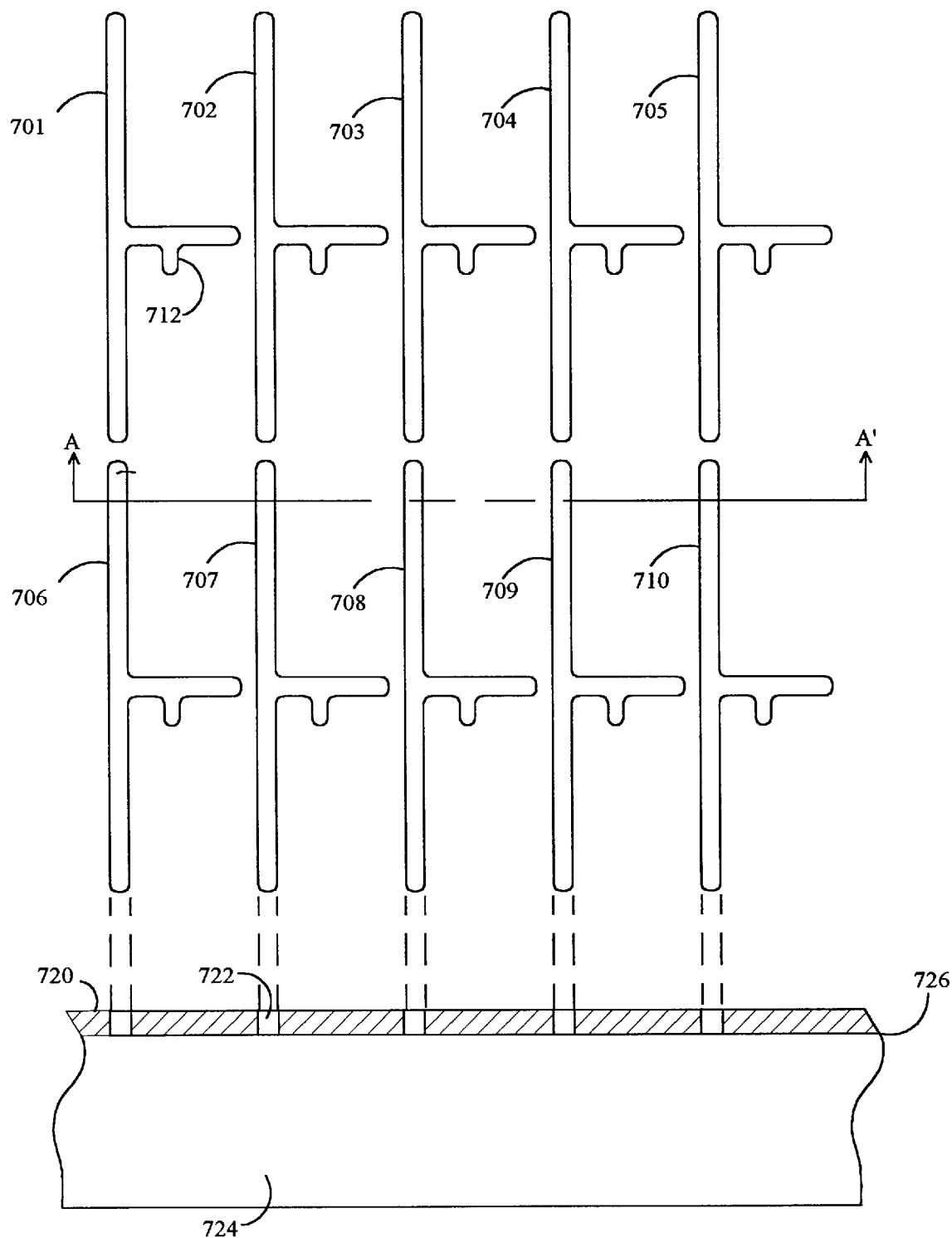
FIG. 7 shows an array of blank pixel areas defined by the outline of an etched profile for a trench capacitor area extended to form a 'T' shape in accordance with the present invention.
Figure 8A:
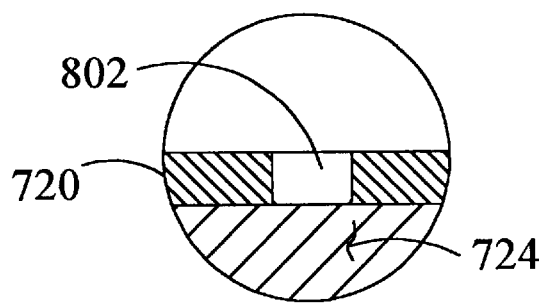
FIG. 8(a) shows a step in forming a trench capacitor for each pixel in accordance with the present invention.
Figure 8B:
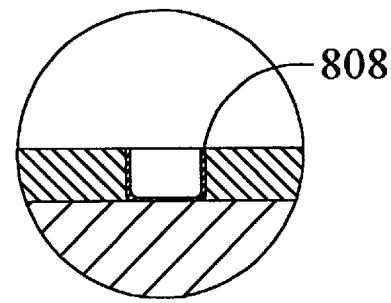
FIG. 8(b) shows a next step in forming a trench capacitor for each pixel in accordance with the present invention.
Figure 8C:
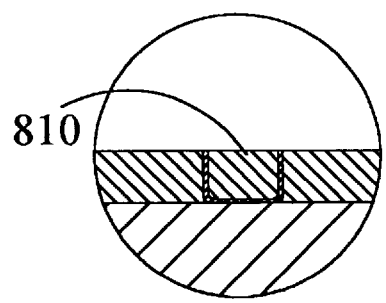
FIG. 8(c) shows a next step in forming a trench capacitor for each pixel in accordance with the present invention.
Figure 8D:
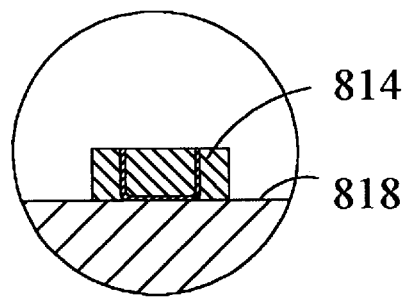
FIG. 8(d) shows a next step in forming a trench capacitor for each pixel in accordance with the present invention.
Figure 8E:
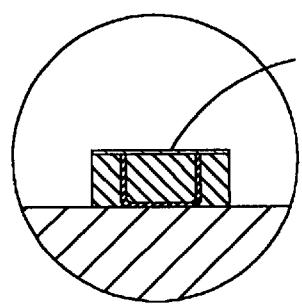
FIG. 8(e) shows a next step in forming a trench capacitor for each pixel in accordance with the present invention.

Each pixel of the array of blank pixel areas shown in FIG. 7 is defined by the outline of the etched profile for a trench capacitor 701–710. Although, the extended capacitor is shown in the form of a 'T', increased space utilizations results by using a capacitor trench which also extends along one of the pixels ground electrodes. A stud 710 is included in the etched profile to provide a contact point for a TFT electrode. FIG. 7 also shows an edge view taken along A–A' of the initial pattern. It shows the patterned C-Si layer 720 containing the etched capacitor profile 722 on top of the transparent substrate 724. The C-Si layer 720 is typically 1 micron wide.

The next steps form a capacitor in each trench as shown in FIG. 8. FIG. 8(a) shows a typical trench 802 etched into the C-Si layer 720 on the transparent substrate 724. The capacitor is formed by growing and/or depositing approximately 50 Angstroms of an insulator 808 inside the trench, as shown in FIG. 8(b). A thin oxide or oxide/nitride layer is typically used as the insulator. Next the insulated trench 808 is filled with a conductive material such as poly-Si forming a trench electrode 810, as shown in 8(c). This electrode 810 serves as the inner electrode of the trench capacitor. A clear aperture area 818 is formed by patterning and etching away all but a thin portion 814 of the C-Si layer 720 surrounding the trench. This portion 814 serves as the outer capacitor electrode, as shown in FIG. 8(d). Then the trench capacitor is covered with an insulator 816, as shown in FIG. 8(e).

Figure 9A:
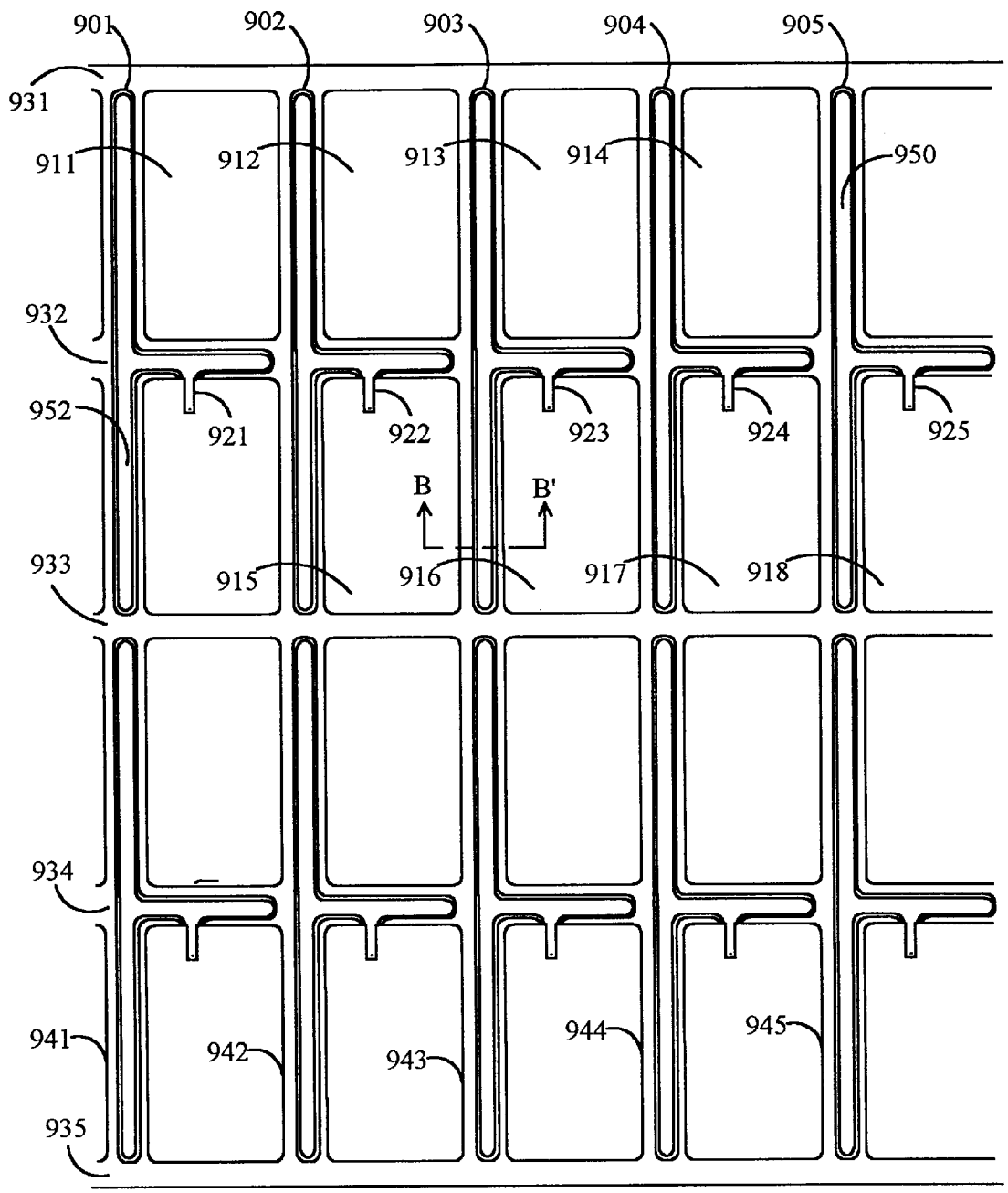
FIG. 9 shows the completed 'T' shaped trench capacitor array of capacitors and the clear areas included between them in accordance with the present invention.
Figure 9B:
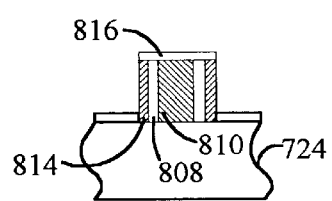

FIG. 9(a) shows an array of 'T' shaped trench capacitors 901–905 and the clear areas 911–918 included between them. FIG. 9(b) shows a sectional view of 'T' shaped capacitor 903 formed by a P-Si inner electrode 810, a thin oxide insulator 808 and a C-Si outer electrode 814. FIG. 9(a) shows studs 921–925 for the TFT connection. One stud protrudes from each capacitor and is exposed by an indentation in each of the clear areas 915–918. The remaining unetched portions of the C-Si 814 form the rows 931–935 and columns 941–945 upon transparent substrate 724. The C-Si 814 portions of all the capacitors are shown to be contiguous with each other. This is generally used as the common display electrode and is normally in contact with the power ground terminal.

The process continues with the construction of a thin film transistor, TFT, in each clear area to form the pixel circuit arrangement previously shown in FIG. 3.

Figure 10A:
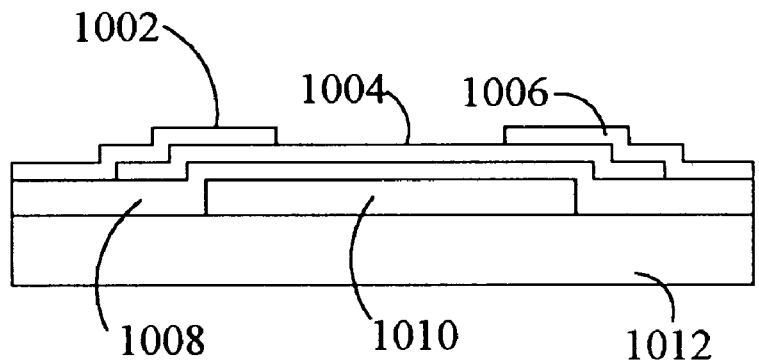
FIG. 10(a) shows a cross section of an inverted staggered TFT.
Figure 10B:
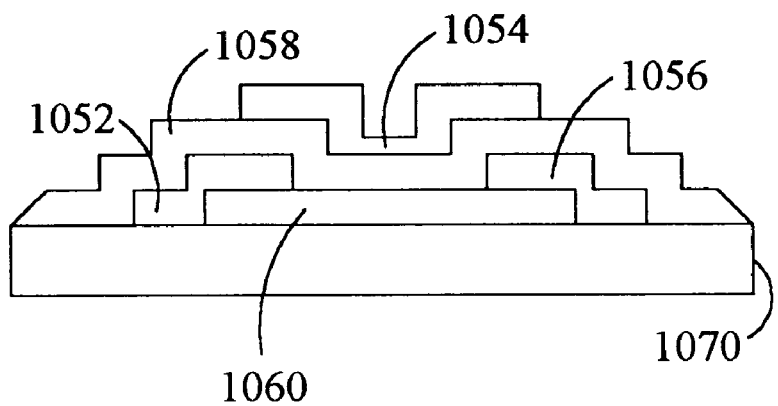
FIG. 10(b) shows an alternative TFT configuration using a coplanar TFT structure.

Each pixel is constructed to include a TFT formed as normally practiced. FIGS. 10(a) and 10(b) show edge views of two TFT formations. FIG. 10(a) shows a cross section of an inverted staggered TFT 1000, characterized by a bottom gate electrode and having top drain and source contacts. It shows a transparent substrate 1012 upon which a gate 1010 is deposited. The gate 1010 is covered by a gate insulator 1008 upon which a semiconductor 1004 is layered. A source 1002 and a drain 1006 are deposited over semiconductor 1004.

An alternative TFT configuration 1050 is shown in FIG. 10(b). This configuration is referred to as a coplanar TFT structure because the transistor's gate 1054, source 1052, and drain 1056 electrodes are on the same side of the semiconductor 1060. Here also the TFT 1050 is formed on a transparent substrate 1010 such as glass. The TFT transistors can be made using various active materials. These include Cds, Cdse, Te, polysilicon, amorphous silicon and amorphous germanium. Any of these may be substituted for the materials specified in describing this invention.

Figure 11:
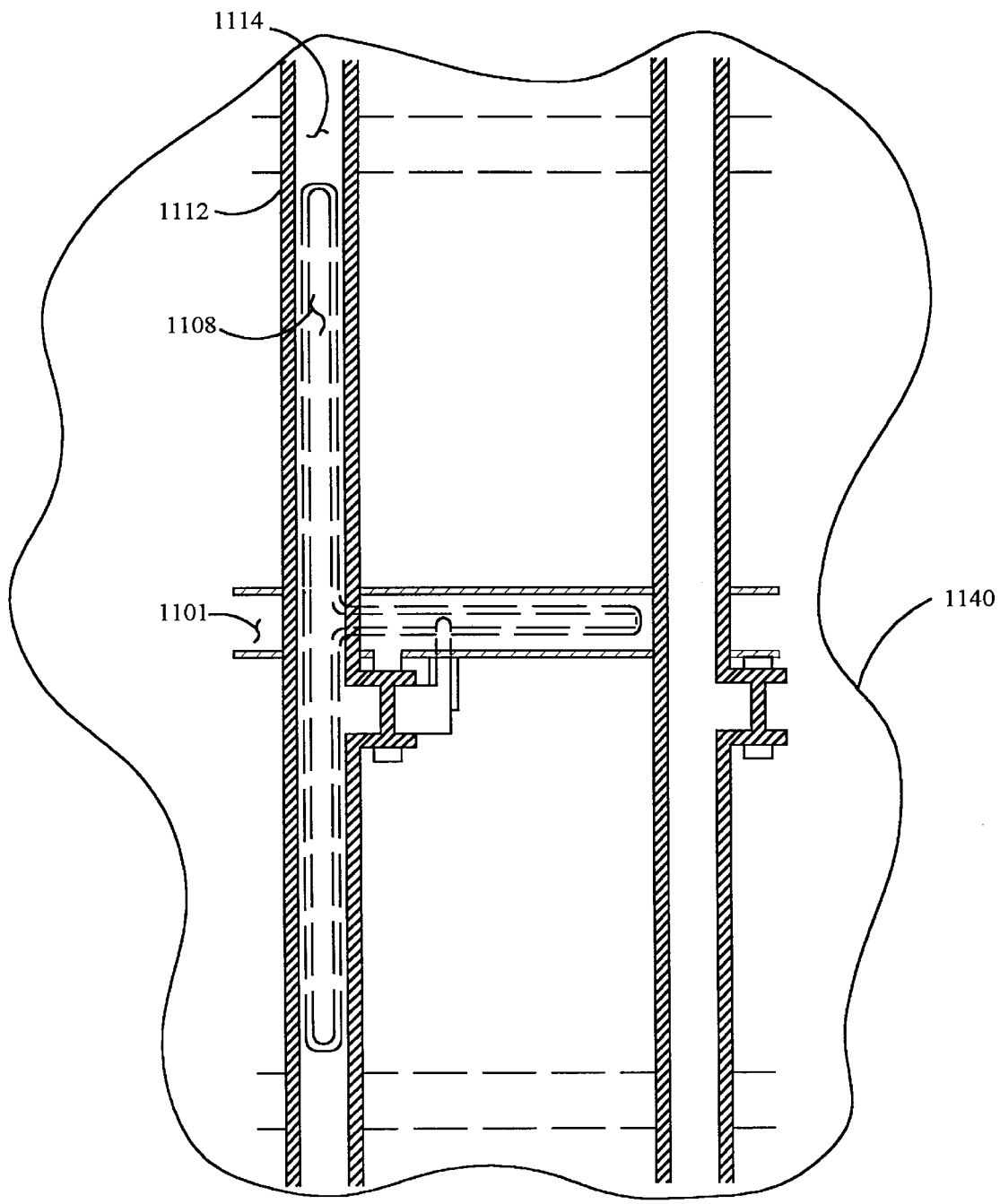
FIG. 11 shows an embodiment with the formed TFT in accordance with the present invention.

An embodiment showing the formed TFT is shown in FIG. 11. The circuit is formed on a clear substrate 1140 as follows. The gate line region of the display row 1101 which includes the buried trench capacitor 1108, is covered with a thin oxide insulator 1112. This is followed by the deposition of the gate line 1114 itself.

Figure 12A:
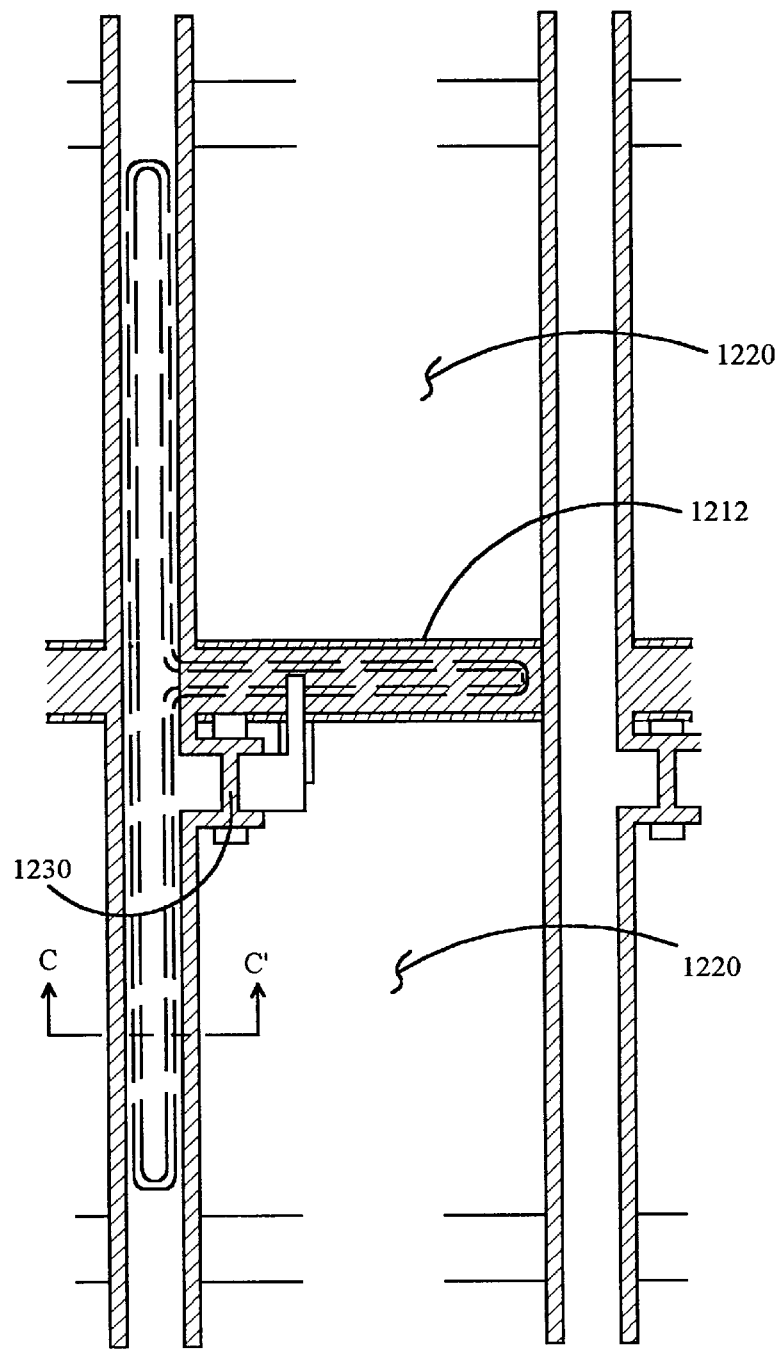
FIG. 12(a) shows the step of depositing a thin layer of indium tin oxide over and within the clear areas in accordance with the present invention.
Figure 12B:
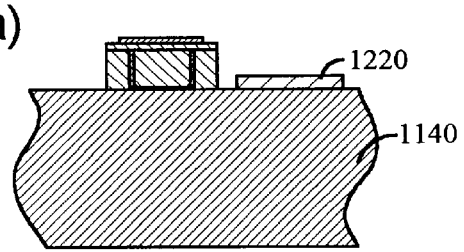
FIG. 12(b) shows a side view of the embodiment shown in FIG. 12(a)

Referring to FIGS. 11, 12(a) and 12(b), a semiconductor stack 1230 is deposited over the TFT region to form the TFT. Then a thin layer of indium tin oxide, ITO, 1220 is deposited over and within the clear areas 1216, 1218 shown in FIG. 12. The ITO 1220 becomes the lower pixel electrode. The ITO lower electrode 1220 is used to switch the state of the liquid crystal ON and OFF.

Figure 13A:
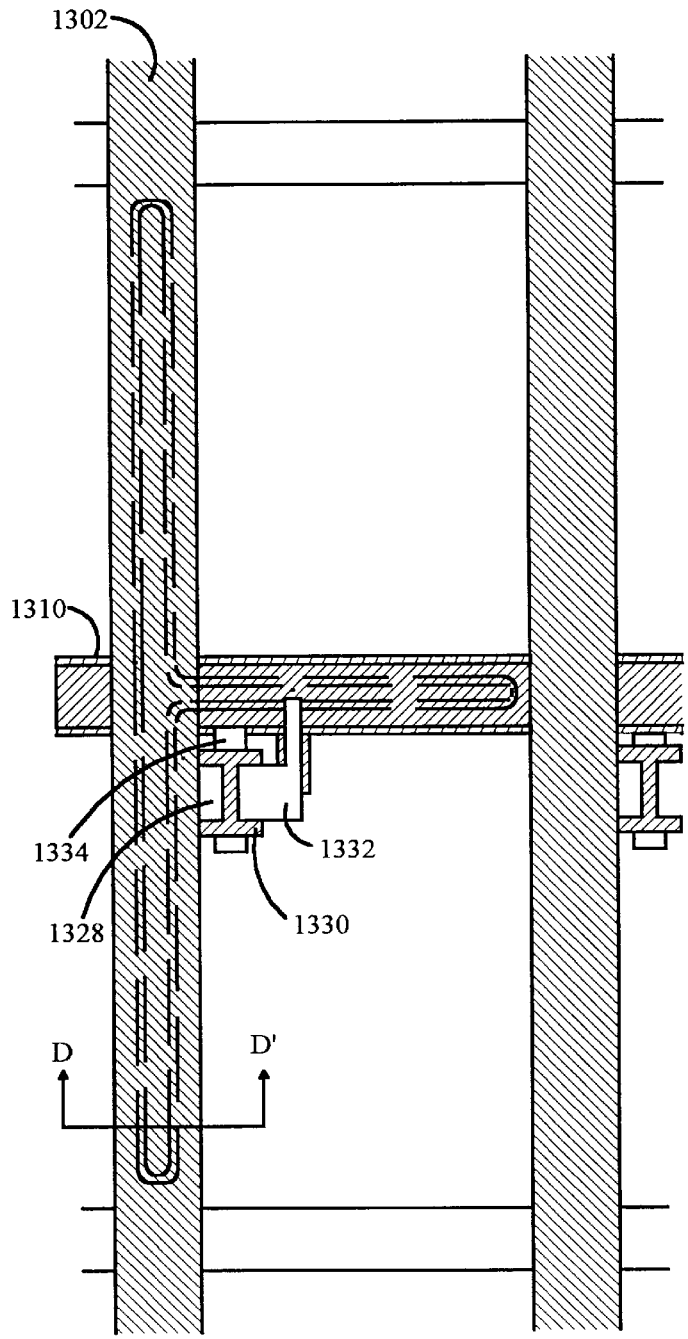
FIG. 13(a) shows the steps of covering the column and row regions 1026 of FIG. 10 with an insulating layer and depositing a metal data lined on the insulated column regions wherein the data line has a protrusion which lies over the gate area of the TFT forming the TFT source in accordance with the present invention.
Figure 13B:
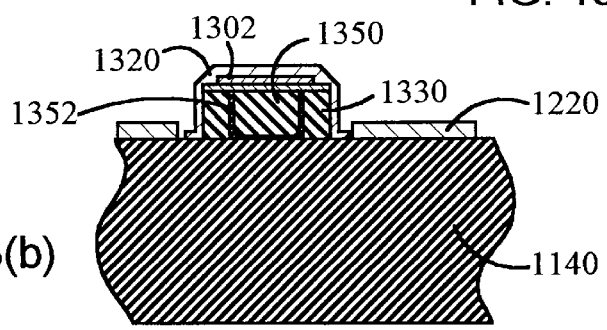
FIG. 13(b) shows a side view of the embodiment shown in FIG. 13(a)

Next, the column regions 1122, 1124 and row region 1126 of FIG. 11 are covered with an insulating layer 1310, 1320 as shown in FIG. 13. A metal data line 1302 is deposited on the insulated column regions 1122, 1124. The data line 1302 has a protrusion 1328 which lies over the gate area of the TFT 1330 forming the TFT source. Simultaneously with the formation of the data line 1302 a drain contact metal 1332 is formed. The contact metal is made to overlap the TFT 1330, the ITO 1220 and the stud 1034 of the P-Si trench capacitor inner electrode. An insulator 1320 is deposited over the metal data line. The sideview of the completed data line region is shown in FIG. 13(b). It includes the clear substrate 1140; the C-Si 1330; the oxide layer 1352; the P-Si storage capacitor center electrode 1350; the center electrode insulator 1330, and the ITO 1220. This completes the circuit of the pixel in a way that has the storage capacitor formed under the metal lines rather than being in the clear areas 1016 or 1018. The method described for the single pixel 1000 is actually performed simultaneously for a large group of pixels in the pixel array of the display.

Figure 14:
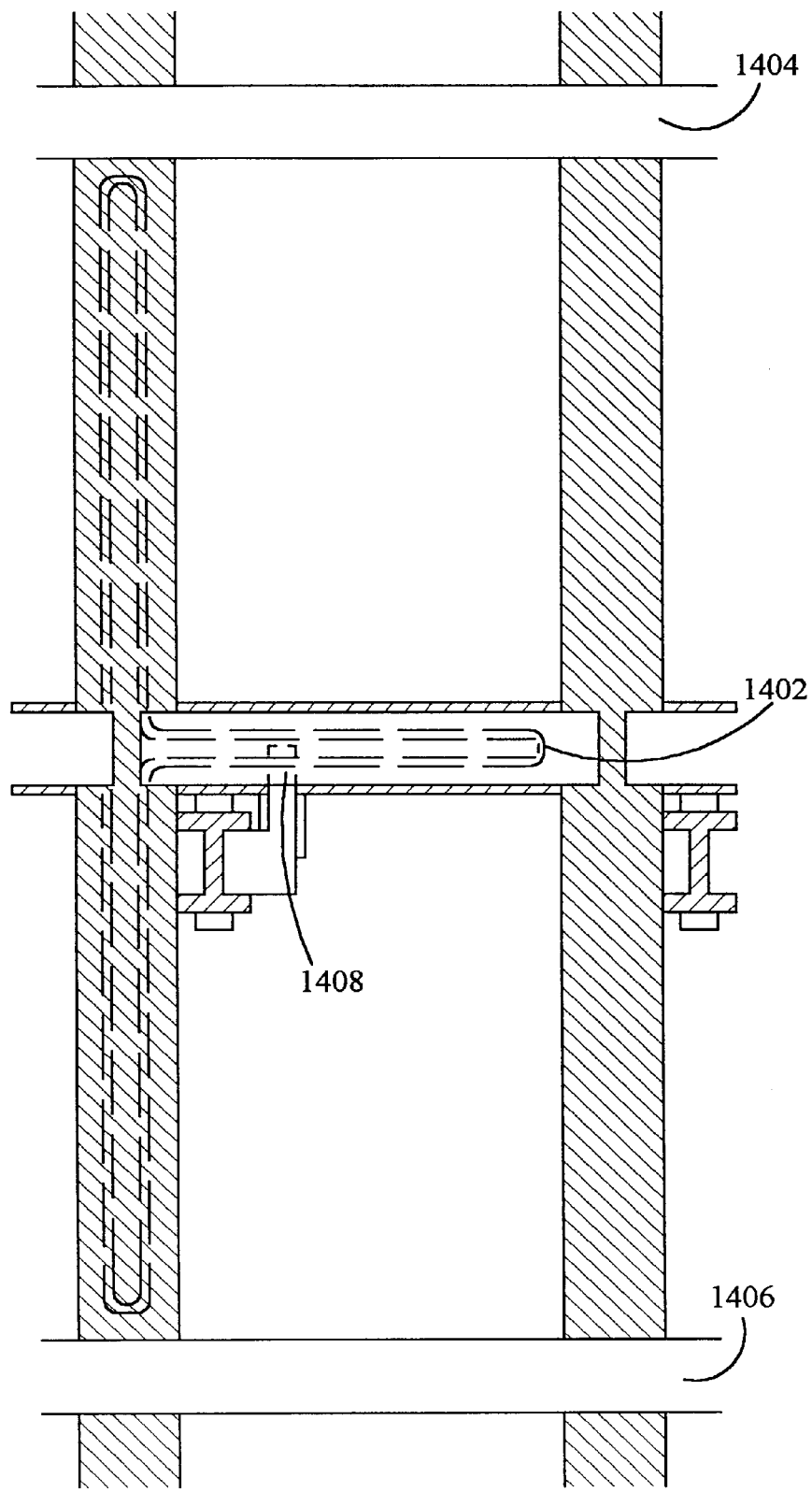
FIG. 14 shows the step wherein the vertical active electrodes and vertical ground electrodes are patterned and grown, and wherein the active electrode makes contact with a drain pad of the TFT in accordance with the present invention.
Figure 15:
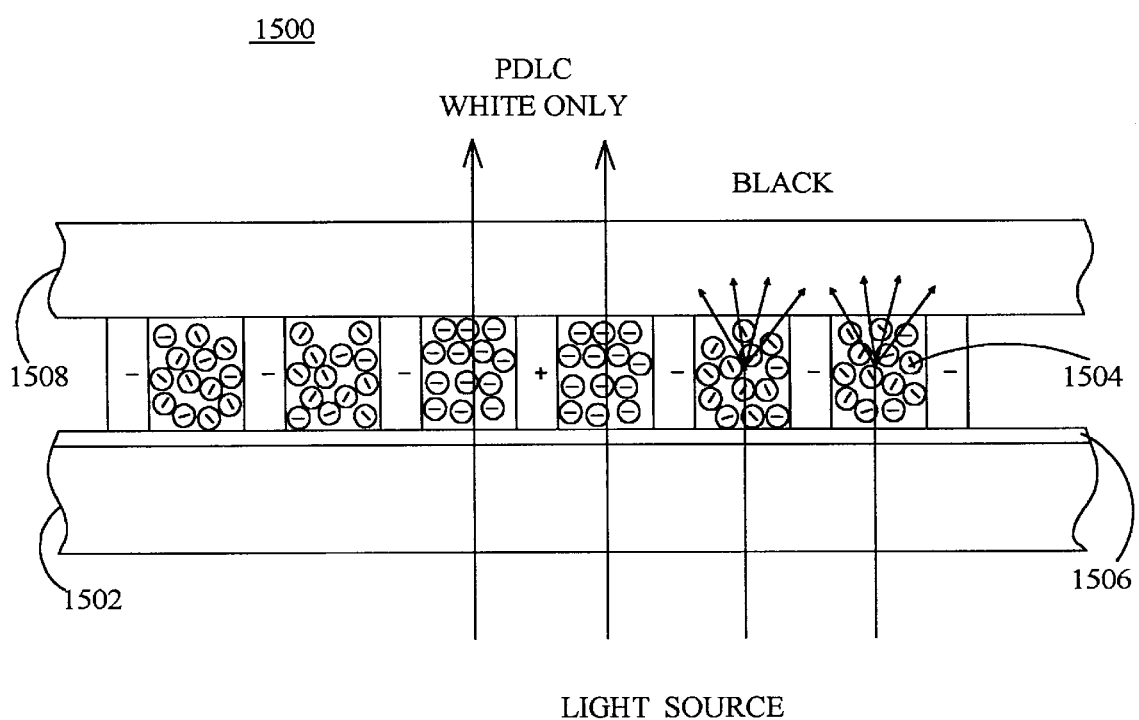
FIG. 15 shows a completed lower substrate of a portion of the display device pixel array in accordance with the present invention.

In accordance with the present invention vertical active electrodes 1402 and vertical ground electrodes 1404, 1406 are patterned and grown as shown in FIG. 14. The active electrode 1402 makes contact with a drain pad 1404 of the TFT. The device so formed is completed after it undergoes passivation and the other processes customary with standard TFT pixel cells and results in a completed lower substrate 1502 of the portion of the display device pixel array 1500 shown in FIG. 15. The passivation protects the metal layers. Each pixel cell is filled with PDLC material 1504 which covers the circuit layers 1506 of the lower substrate 1502. A top cover glass 1508 is used to seal the assembly 1500. The top glass 1508 need not be coated with ITO since no electrical contact is formed using it. Also, liquid crystal alignment films are not required due to the nature of the PDLC material 1504.

Although the process is described for an embodiment in which a trench capacitor is formed and hidden below parts of the gate and/or data lines, alternate capacitor placement methods may similarly be used together with the vertical electrodes of this invention. An alternate capacitor placement normally reduces the clear aperture ratio of the display cell. The clear aperture ratio (AR) is defined as:

$$AR = \frac{\text{(Area of a display cell through which light passes)}}{\text{(The total area of a display cell)}}$$

Figure 16A:
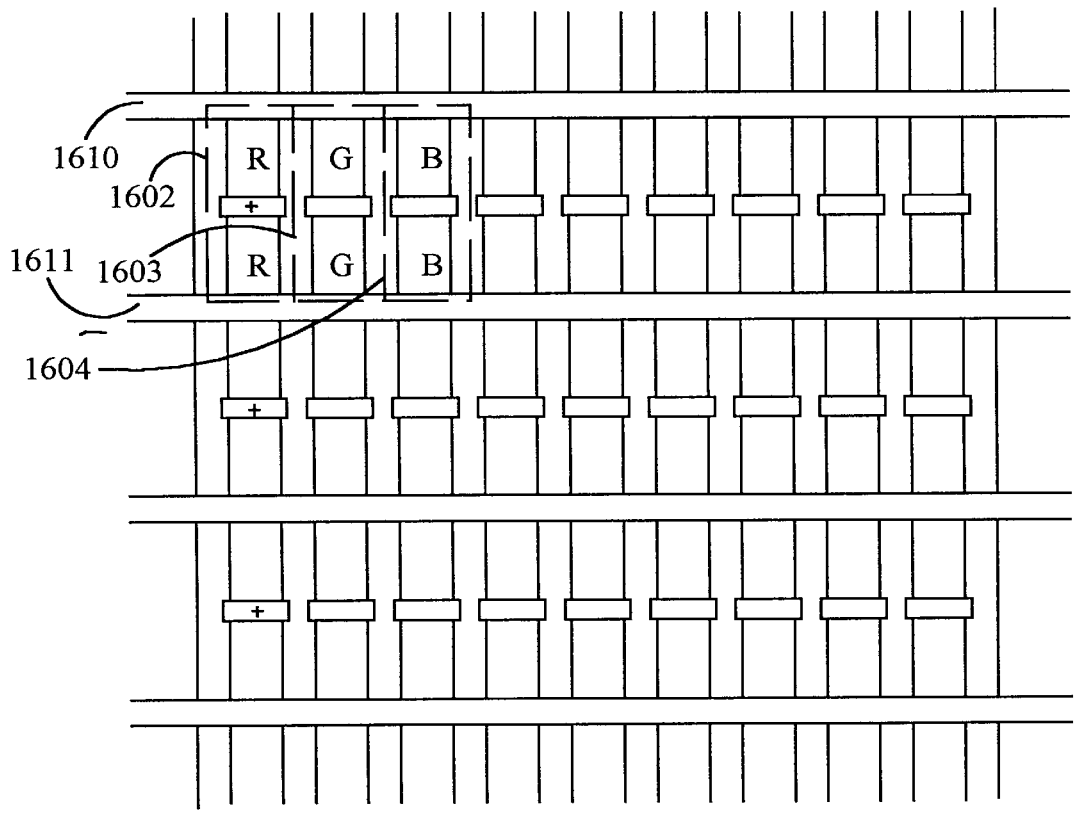
FIG. 16(a) shows an embodiment of the present invention for an RGB (red, green, and blue) color display device in accordance with the present invention.
Figure 16B:
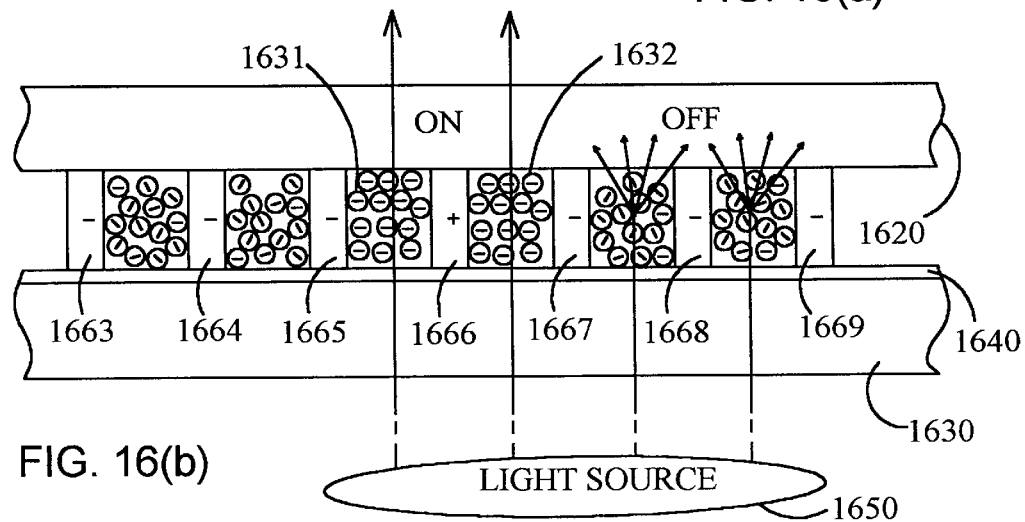
FIG. 16(b) shows a completed side view of the display for the embodiment shown in FIG. 16(a)

FIG. 16(a) shows an embodiment of the present invention for an RGB (red, green, and blue) color display device 1600. An 'R' subpixel 1602 is shown surrounded by a pair of vertical ground electrodes 1610, 1611 and having a central vertical active electrode 1621. A 'G' subpixel 1603 is shown adjacent to the 'R' subpixel 1602. Similarly, a 'B' subpixel 1604 is shown adjacent to the 'G' subpixel 1603. The three subpixels form an RGB color pixels. Groups of three adjacent subpixels are similarly used to provide additional R, G, and B color pixels to fill out the device pixel array.

The PDLC (polymer dispersed liquid crystal) is generally droplets of liquid crystal in a polymer material forming a PDLC bath. When aligned by an electric field, the index of refraction of the PDLC is (almost) the same as that of the surrounding polymer solution within which it bathes. This allows the light transmitted to it to pass through the PDLC bath. Without an electric field, the light is scattered by the unaligned PCLC material reducing the amount of light that passes through the PDLC bath. Other display embodiments operate in a reverse mode in which light passage is controlled in a reverse manner as that described.

The vertical ground electrodes are usually at ground potential and a vertical active electrode is brought to a positive potential sufficient to create a field to align the PDLC material adjacent to that active electrode so as to allow light to pass through. This is shown in FIG. 17(b). A light source 1650 transmits light towards through transparent substrate 1630. It passes through the circuit layers 1640. Vertical active electrodes 1663–1665 and 1667–1669 are held at ground or a negative potential shown with a minus sign. Vertical active electrode 1666 is brought to a positive potential to change the state of light passage through the PDLC bath. The positive potential is shown by a plus sign and is sufficient to cause the alignment of the PDLC material, 1631, 1632 on both sides of electrode 1666 to allow pass through of the light towards the cover glass 1620. The unaligned PDLC material between electrodes 1663 and 1665 and electrodes 1667 and 1669 causes the light to scatter, constituting the pixel dark state.

Figure 17:
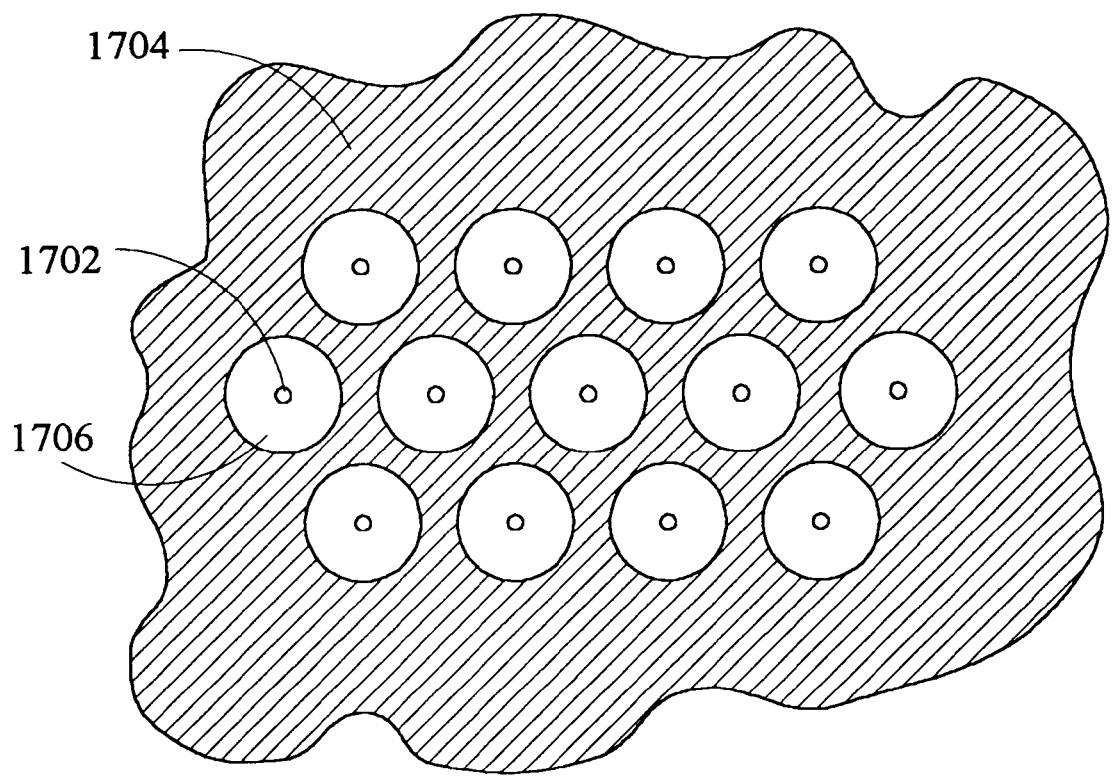
FIG. 17 shows an alternate embodiment of the present invention with a top view of an array of vertical active post electrodes surrounded by a common vertical ground electrode in accordance with the present invention.

FIG. 17 shows an alternate embodiment of the present invention. It shows a top view of an array of vertical active post electrodes 1702 surrounded by a common vertical ground electrode 1704. This type of electrode arrangement is used for extremely small pixel sizes and decreases the crosstalk between pixels and/or subpixels. The area between the active post electrodes 1702 and the common ground electrode is filled with PDLC material 1706.

In one embodiment the display utilizes the principle of a twisted nematic display in the normally white mode. An arrangement of a pixel with polarizers known as the normally white mode of operation causes the display module to be bright in an unactivated state. This mode is generally also used in calculator displays when a reflector is included behind the lower polarizer. Other embodiments utilize a normally black mode. In this mode each local optic axis undergoes a continuous 90° twist in the inactivated state. It is otherwise predominantly parallel to the electric field corresponding to an activated state.

Generally, a polyimide coating several hundred Angstroms in thickness is unidirectionally rubbed to align each local optic axis of the liquid crystal at the surfaces parallel to the rubbing direction. An upper substrate is rubbed at right angles to the rubbing direction of a lower substrate. PDLC material requires no rubbing. In an unactivated state the local optic axis (director) undergoes a continuous 90° twist in the region between the substrates. Usually, polarizing sheets are laminated on the outside of the plates to cause the direction of vibration of the linear polarized light to be parallel to the rubbing direction of the adjacent alignment layer at the upper and lower substrate. Linear polarized light hitting the upper polarizer propagates through the layer and rotates its plane of polarization in step with the twisted structure. The light comes out of the layer so as to be polarized parallel to the transmission axis of the lower polarizer.

Applying a potential across the upper and lower electrodes causes the optic axis in the central portion of the LC layer to be oriented predominantly parallel to the electric field formed. This causes the twisted structure to disappear. Thus, the polarization direction of the light is not rotated. The light passing through the cell intersects the second polarizer in a crossed polarized position. This causes the light to be absorbed, making the activated portion of the display to appear dark. A potential of 2.5–5.5 volts is generally sufficient to form the required electrical field.

Figure 18:
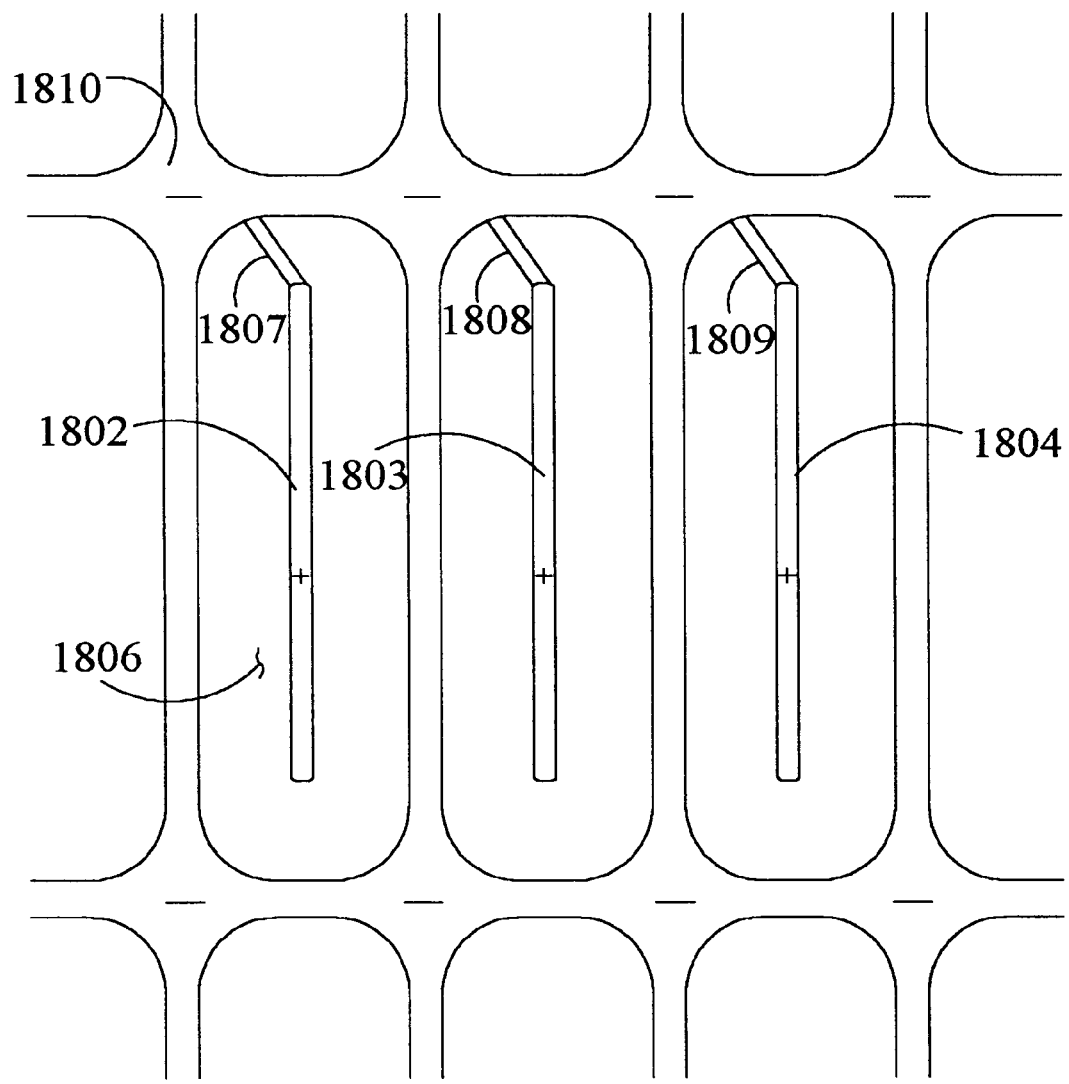
FIG. 18 shows a top view of another alternate vertical electrode arrangement, wherein each pixel has an elongated central vertical active electrode surrounded by a common ground electrode having rounded rectangular apertures which include the active electrodes in accordance with the present invention.

FIG. 18 shows a top view of another alternate vertical electrode arrangement. Each pixel has an elongated central vertical active electrode 1802 surrounded by a common ground electrode 1810 formed having rounded rectangular apertures 1806 surrounding the active electrodes, 1802. This configuration provides for varying pixel sizing and shaping. Each is connected to its respective TFT on a circuit layer 1806 via an electrode connector line 1807–1809. The vertical active electrodes 1802–1804 are surrounded by a common vertical ground 1810.

Figure 19:
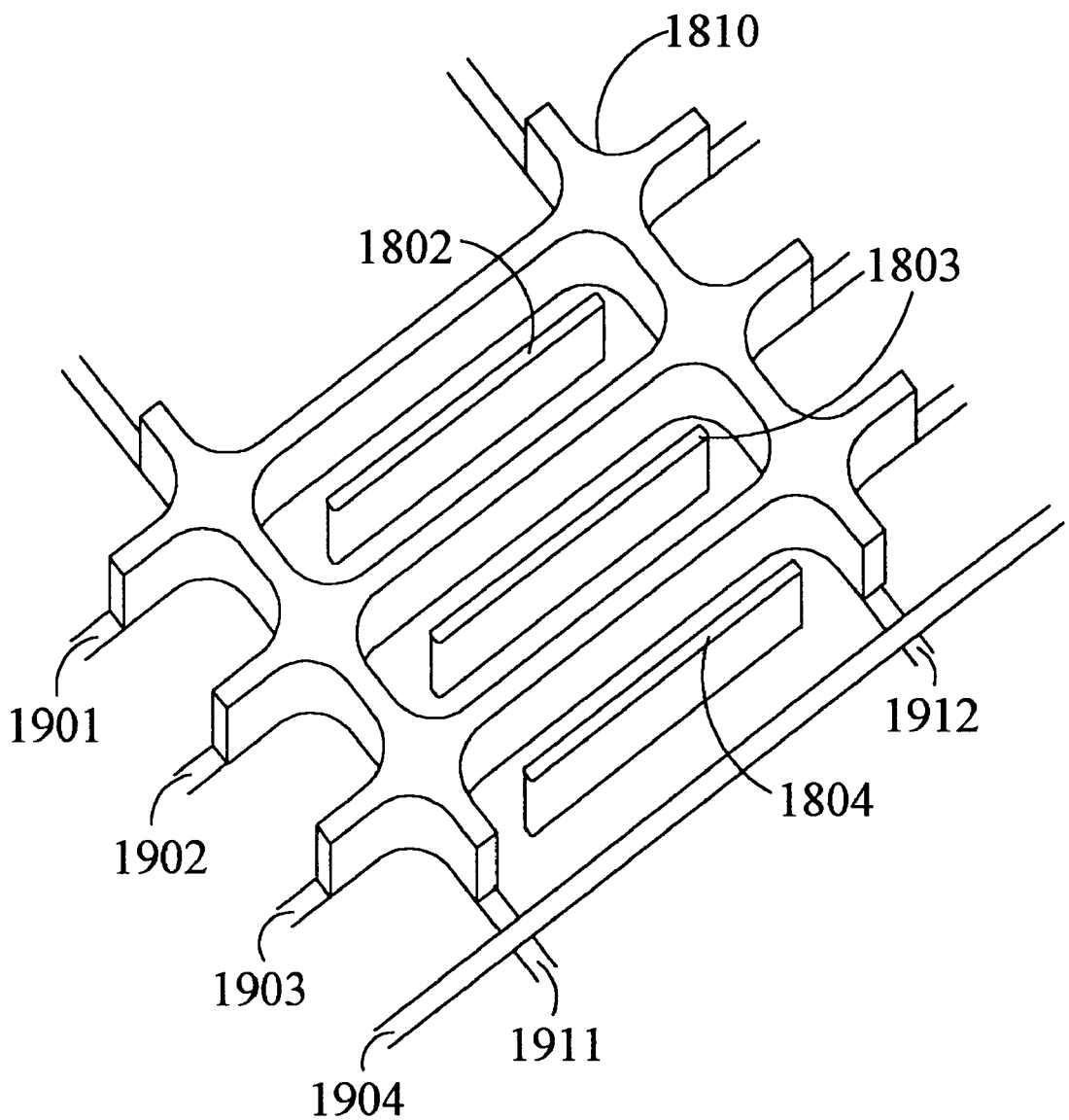
FIG. 19 shows an isometric view of the configuration of FIG. 18 in accordance with the present invention.

FIG. 19 shows an isometric view of the configuration of FIG. 18. It shows vertical active electrodes 1802–1804 surrounded by common vertical ground electrode 1810. The isometric is sectioned to reveal data line regions 1901–1904 and gate line regions 1911–1912.

This invention includes several unique characteristics. It is a liquid crystal cell extendible to the UXGA resolution in transmission for head-mounted displays. It can use a vertical trench capacitor as a pixel storage capacitor. It is the first instance of using vertical electrodes to ensure a large aperture ratio. This structure uses a transparent SOI (silicon on insulator) substrate (e.g., Kopin). Some configurations of the cells are surrounded by ground (FIGS. 3, 4), and thus reduce or eliminates crosstalk between cells. Crosstalk in TN-LC cells is a potential limitation in scaling the cell to small sizes.

It is noted that this invention may be used for many applications. It also provides a spatial light modulator that can be used even in high resolution head-mounted displays and projection displays. Although the description is made for particular arrangements and applications, the intent and concept of the invention is suitable and applicable to other arrangements and applications. For example, the types, sizes and shapes of vertical electrodes in various combinations of placement of the storage capacitor often increases the aperture ratio in large display and results in increased operational efficiency. It will be clear to those skilled in the art that other modifications to the disclosed embodiments can be effected without departing from the spirit and scope of the invention.

What is claimed is:

1. A structure comprising:
   a first plate;
   a second plate disposed adjacent to said first plate to form a space therebetween, said space is filled with a liquid crystal material;
   one of said first plate and said second plate has electrically conductive patterns thereon; and
   a capacitive element disposed to be in a generally perpendicular direction with respect to a portion of said electrically conductive pattern;
   said capacitor is formed in an area etched out in a portion of said electrically conductive pattern.

2. A structure as recited in claim 1, wherein there is a plurality of said capacitive elements.

3. A structure as recited in claim 1, wherein said capacitive elements are formed from metal plates disposed in said generally perpendicular direction.

4. A structure as recited in claim 1, wherein said capacitive element is formed in one of said plates from a semiconductor.

5. A display structure as recited in claim 4, wherein said capacitor is formed in a 'T' shaped configuration.

6. A display structure having an array of pixels, each of said pixels comprising:
   a perimeter defined by a pair of row lines and a pair of column lines, said lines enclosing a light passing area defining an aperture;
   a thin film transistor coupled to said lines;
   a capacitor having a first and second terminal, said first terminal being coupled to said transistor;
   a first vertical electrode coupled to said transistor for accepting a first control potential polarity; and
   a second vertical electrode coupled to said second terminal for accepting a second control potential polarity, and disposed on at least a portion of said lines such that a space is formed between said first vertical electrode and said second vertical electrode; and
   PDLC material included within said space;
   said capacitor is formed into an area etched out in a portion of at least one of said lines.

7. A structure as recited in claim 6 wherein said capacitor is formed behind at least one of said lines such as to limit an amount of said light passing area being obscured by said capacitor.

8. A structure as recited in claim 6 wherein:
   said row line is a gate line defining a gate;
   said column line is a data line; and
   said capacitor is a storage capacitor.

9. A display structure as recited in claim 6, wherein said thin film transistor is formed in an inverted staggered structure configuration.

10. A display structure as recited in claim 6, wherein said array of pixels is formed by a plurality of liquid crystal cells extendible to a resolution required for UXGA light transmission for head-mounted displays.

11. A display structure as recited in claim 6, wherein said capacitor is formed in a 'L' shaped configuration.

12. A display structure as recited in claim 7, wherein said capacitor is formed in a trench etched out of a C-Silicon layer behind a portion of at least one of said lines, said trench being surrounded by an insulating layer filled with polysilicon.

13. A liquid crystal cell extendible to the UXGA resolution in transmission for head-mounted displays and comprising:

a transparent silicon on insulator substrate;

a vertical trench capacitor mounted on said substrate as a storage capacitor for said cell;

a vertical active electrode etched onto said substrate;

a vertical common ground electrode etched onto said substrate; and liquid crystal material bathed in a polymer included in spaces between said vertical active electrode and said vertical common ground electrode, and wherein said capacitor is formed in an area etched out in a portion of said vertical active electrode or said vertical common ground electrode.

14. A liquid crystal cell as recited in claim 13, wherein said material is Kopin.

15. A display structure having a plurality of pixels, each of said pixels including a liquid crystal cell comprising:

a transparent silicon on insulator substrate;

a vertical trench capacitor mounted on said substrate as a storage capacitor for said cell;

a vertical active electrode etched onto said substrate;

a vertical common ground electrode etched onto said substrate; and liquid crystal material bathed in a polymer included in spaces between said vertical active electrode and said vertical common ground electrode, and wherein said capacitor is formed in an area etched out in a portion of said vertical active electrode or said vertical common ground electrode.

16. A display structure as recited in claim 15, wherein said vertical active electrode has a shape of a post.

17. A display structure as recited in claim 15 wherein said spaces have a circular shape.

18. A display structure as recited in claim 15, wherein said ground electrode of each said cell is formed to be common with a plurality of other ground electrodes and formed to surround each of said pixels so as to reduce crosstalk between said pixels.

* * * * *